Patented Dec. 15, 1936

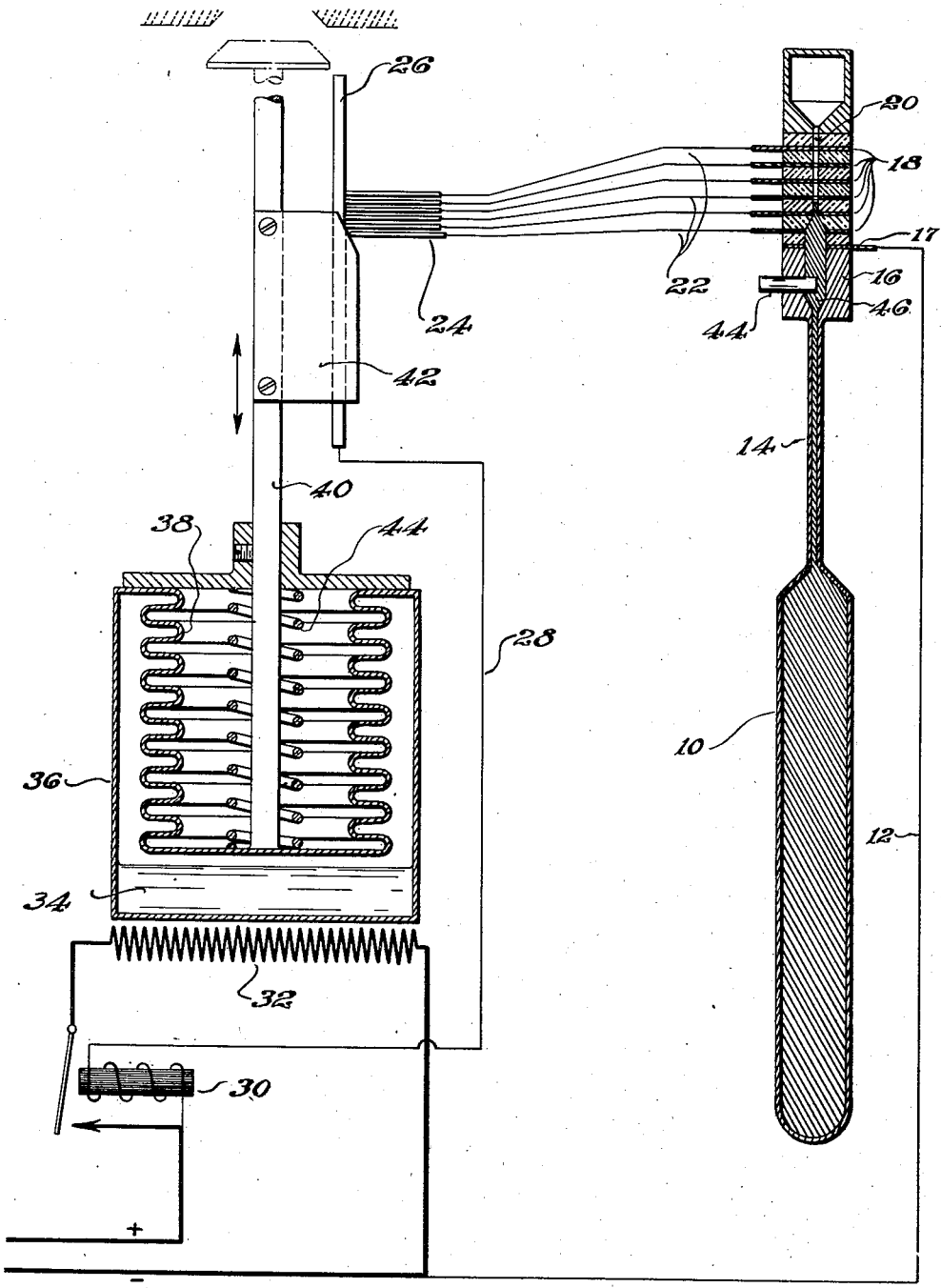

2,064,163

UNITED STATES PATENT OFFICE 2,064,163

THERMOSTATICALLY CONTROLLED DEVICE

Emil A. Ileman, Medford, Mass., assignor to Wilbin Instrument Corporation, New York, N. Y., a corporation of New York Application June 6, 1934, Serial No. 729,271

1 Claim. (Cl. 236—68)

The present invention relates to thermostatically controlled devices, and is more particularly concerned with devices of this character in which the valve or equivalent device for supplying heat or the like receives its motive power from a source independent of but controlled by the primary thermostat. With this type of operation any desired amount of power for operating the supply valve or switch may be secured, the control of this power being dependent upon temperatures indicated by the thermostat.

The purpose of the present invention is to provide apparatus of this character in which the necessary power for the operation of the heat controlling devices is available, coupled with a sensitivity of control which makes the valves or similar heat controlling devices active upon relatively slight variations in temperature with a resulting nicety of control not previously obtainable.

With this and similar objects in view, the various features of the invention consist in certain novel features of construction, combinations and arrangements of parts hereinafter described and claimed, the advantages of which will be obvious to those skilled in the art from the following description.

The accompanying drawing illustrates in diagrammatic form a simple and efficient apparatus for carrying out the invention.

According to the illustrated embodiment of the invention, the heat supply valve or similar device is actuated directly by a sensitive heat motor which is in turn controlled in its operation by a thermostat which reflects the temperature in the enclosure to be controlled. The heat motor may be preferably caused to operate through the employment of electrical heating devices which cause operation of the motor through vaporization of a heat sensitive fluid therein. The heating elements for vaporizing this fluid are included in circuits controlled jointly by the primary thermostat and the operation of the heat motor itself, as will be evident from the following more complete description.

In actual practice a rising temperature within the enclosure when a predetermined point is reached serves to close the heating circuit, which in turn causes actuation of the motor upon vaporization of the fluid. The resulting actuation of the motor with movement of the connected parts, when it reaches a predetermined point sufficient to partially or completely close the heat controlling supply valve, serves to open the previously closed heating circuit, causing the fluid within the motor to contract with accompanying retraction and complete opening of the supply valve unless the primary thermostat reflects an unchanged temperature in the closure, in which event initial cooling of the heat motor due to opening of the heating circuit causes a reclosing of the circuit upon slight retraction of the motor with a repetition of the cycle, which is continued until cooling of the primary thermostat permits the heating circuit to remain open.

In the illustrated embodiment of the invention, the apparatus provides for a graded control by virtue of which any one of a series of predetermined temperature points closes a corresponding heating circuit, which is only opened in turn upon attainment of a predetermined position of the heat motor connection. If this predetermined position of the heat motor and connected parts corresponds to a similar position of a graduating or metering supply valve or the like, it will be evident that the indication of any one of a series of predetermined temperatures by the primary thermostat may cause the maintenance of a corresponding position of the supply valve by the heat motor, with a continuance of the opening and closing cycle at this point to maintain an approximate balance of the system.

Referring particularly to the drawing, the primary thermostat is indicated as a bulb 10 designed for immersion in a tank or other closure in which the temperature is to be controlled. The bulb is connected through any suitable form of capillary 14 with a head 16, carrying a series of electrical contacts 17 and 18 which intercept a closed duct 20 communicating with the capillary. The entire system may be filled with mercury, the column rising and falling in accordance with changes in temperature in the enclosure, and serving through engagement of the mercury with the fixed contacts 17 and 18 to close any one of a series of circuits through the contact 17 connected to the ground 12 and the circuit connections 22. These circuits are individually connected with movable contacts 24, which normally engage with a fixed contact bar 26, connected through 28 with a source of current. The rising of the mercury column into contact with any one of the members 18 closes the circuit through the accompanying movable contact 24 and the stationary contact 26. The closure of this circuit operating through a relay 30 serves to energize the primary heating circuit containing a heating coil 32. This heating coil, which may be arranged adjacent to or within the chamber of a heat motor, serves to energize vaporizable fluid 34 contained within a receptacle 36, which is closed at its open end by a metallic bellows 38 connected with a stem 40. Upon the generation of sufficient heat to vaporize the fluid and create pressure within the motor, the bellows is contracted to move the connected stem 40 for the purpose of partially or completely closing a supply valve. The movement of the stem when it reaches a predetermined amount causes a cam projection 42 secured to the stem to engage successively with the movable contacts 24 and remove these contacts from closing engagement with the common contact 26. When this cam projection engages and removes the highest contact through which the circuit is closed, the heating circuit is simultaneously opened, the heat motor cools, and the valve stem or rod is retracted. This serves to reclose the circuit providing that the temperature within the closure has not dropped sufficiently to lower the mercury column, the heat motor is re-actuated, causing the valve rod to fluctuate within the region determined by opening and closing of the particular contact controlled by the mercury column.

By virtue of this dual control, the device is exceedingly sensitive, and may be supplied with ample power to control any desired type of valve. As will be readily evident, the capacity of the heat motor and the power generated therein may be dependent upon the size of the heating element, the cubical capacity of the motor, and the leverage in consequence exerted.

The valve rod is designed for actuation of a supply valve which may be of conventional type, and which is shown in dot and dash lines in the drawing. The apparatus as indicated is diagrammatic, and the proportions and general arrangement of the parts may be obviously changed without altering the spirit of the invention. In a like manner, retraction of the heat motor to open the supply valve may be carried out by a coiled loading spring 48 of suitable design, or in some instances may be accomplished by the creation of a vacuum within the motor itself, which serves to withdraw the movable head into the motor. The separation and the spacing of the movable contacts 24 which span a predetermined movement of the valve operating rod or stem will naturally be coordinated with the movements of the valve so that predetermined movements of the valve rod cause engagement with successive contacts and will correspond to the desired graduations in movement of the supply valve itself.

Regulation of the temperature range within which the control is exercised may be varied by displacing the mercury column through the employment of a displacement plunger 44 adapted to enter the enlarged portion 46 of the column for the purpose of displacing a column dependent upon its penetration. The displacement plunger may be mounted and adjusted to vary the displacement by any suitable mechanical means.

What is claimed is:

Thermostatically controlled devices comprising a primary thermostat, a member for controlling the supply of heat to the closure to be regulated designed to graduate the supply, a series of electrical circuits controlled by the primary thermostat upon the attainment of predetermined temperatures, independent means for actuating the graduated supply member controlled in its operation by the closing of one of the electrical circuits, and connections therewith for opening the closed circuits upon a predetermined movement of the heat supplying means, and for thereafter causing the heat supplying means to fluctuate within a region determined by the opening and closing of the circuit corresponding to the highest temperature so long as this temperature remains approximately the same.

EMIL A. ILEMAN.